(No Model.)
S. SHAW.
PULVERIZER AND SEEDER.
No. 335,966. Patented Feb. 9, 1886.
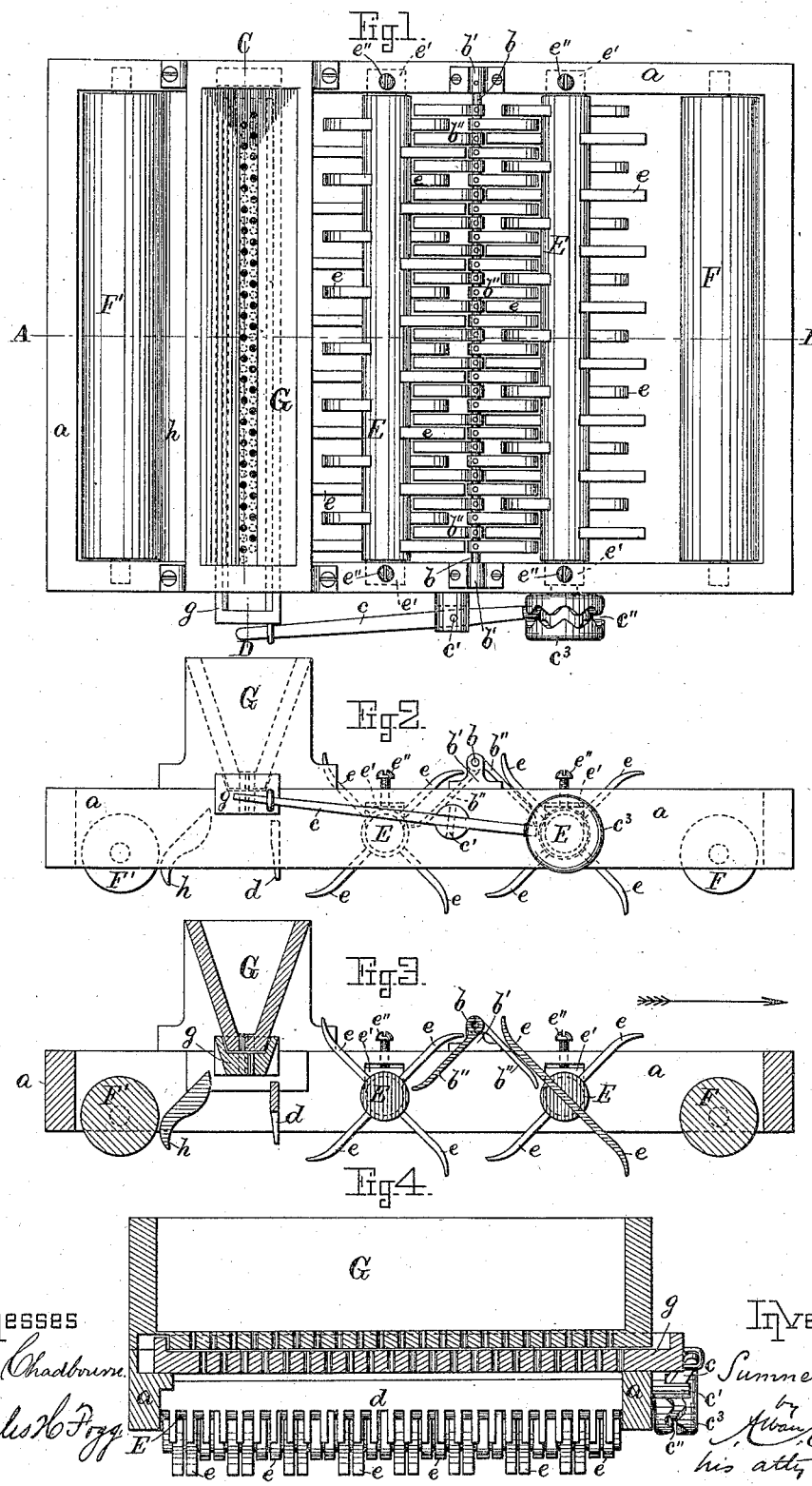

UNITED STATES PATENT OFFICE.

SUMNER SHAW, OF BOSTON, MASSACHUSETTS.

PULVERIZER AND SEEDER.

SPECIFICATION forming part of Letters Patent No. 335,966, dated February 9, 1886.

Application filed September 26, 1885. Serial No. 178,228. (No model.)

*To all whom it may concern:*

Be it known that I, SUMNER SHAW, a citizen of the United States, residing at Boston, in the county of Suffolk and State of Massachusetts, have invented certain new and useful Improvements in Pulverizers and Seeders; and I hereby declare that the same are fully described in the following specification and illustrated in the accompanying drawings.

This invention relates to improvements in agricultural implements; and it is adapted to disintegrate, loosen, and turn over the soil, whether or not the latter is previously plowed, and to deposit the seed in the ground, and, finally, to cover the seed automatically with a sufficient amount of earth, as will hereinafter be more fully described, reference being had to the accompanying drawings, where—

Figure 1 represents a plan view of the invention, and Fig. 2 represents a side elevation of the same. Fig. 3 represents a section on the line A B, shown in Fig. 1; and Fig. 4 represents a section on the line C D, (seen from A in said Fig. 1.)

Similar letters refer to similar parts wherever they occur on the drawings.

$a$ represents a hollow frame, in bearings in which are located one or more shafts or barrels, E E, provided with a series of teeth, $e\ e\ e$, which are preferably made hooked, as shown in Figs. 2 and 3, but may be made of other suitable form, according to the nature of the soil for which the farming implement is to be used. The trunnions or ends of the shafts or barrels E E are loosely supported in bearings $e'\ e'$, that are capable of a vertical adjustment in the frame $a$ by means of regulating-screws $e''\ e''$ or equivalent devices. Such vertical adjustment of barrels E E is for the purpose of regulating the depth of the earth actuated by the teeth or pulverizers $e\ e\ e$.

To the forward end of frame $a$ is journaled the loosely-rotating roller F, and to the rear end of such frame is journaled a similar roller, F', such rollers serving for the purpose of permitting the implement to be drawn easily over the ground and to limit the depth of action in the soil of the pulverizers or teeth $e\ e$. The rear roller, F', also serves for the purpose of rolling down and evening the soil after the seeds have been deposited therein.

For the purpose of removing lumps of earth or other soil-matters from the barrels E E and their teeth or pulverizers $e\ e\ e$, I secure to frame $a$ a suitable toothed comb or cleaner, that is preferably made in the form of a shaft, $b$, secured in bearings $b'\ b'$, attached to frame $a$, and provided with a number of teeth or cleaners, $b''\ b''$, projecting between the pulverizers $e\ e$ on the barrels E E, as shown in Figs. 1, 2, and 3; but said shaft $b$ and cleaners $b''\ b''$ may be made in one piece, if so desired. Such cleaners are used to keep the pulverizers clean when revolving as the frame $a$ is drawn over the ground. In case I should prefer to secure the barrels E E rigidly to frame $a$, the said cleaners may for the time being be dispensed with.

Between the hindmost pulverizer and the rear roller, F', I locate on the frame $a$ the seed trough or receptacle G, having a perforated bottom, as shown, below which is located the laterally-movable perforated slide $g$, that is reciprocated as the implement is drawn over the ground by suitable connecting means from one of the barrels E. In the drawings I have shown such connecting mechanism to consist of a lever, $c$, pivoted at $c'$ to the frame $a$. One end—the forward one—of said lever projects into a cam-groove, $c''$, on the cam $c^3$, secured to the outer end of one of the barrels E, as shown in Figs. 1 and 2, and the rear end of said lever is connected or hinged in a suitable manner to one end of the perforated slide $g$, as shown in said figures. Thus as the implement is drawn over the ground the pulverizers E $e$ are caused to rotate, and by the intermediate connecting mechanism to the slide $g$ the latter is reciprocated, and the seed contained in the receptacle G is free to drop through the perforations in the bottom of said receptacle and the perforations in the slide whenever such perforations coincide in positions. In front of the slide $g$ is located the toothed rake $d$, the object of which is to level the ground that is broken up and turned over by the pulverizers and to make it ready to receive the seeds. Back of the slide $g$ is arranged a scraper, $h$, of any desired shape, the object of which is to scrape or drag a portion of the top soil in front of it, and thus cover up the seeds dropped from the seed-sower in front of it.

The rake $d$ and scraper $h$ are shown as stationary and attached to frame $a$; but, if so desired, they may be made vertically adjustable on the frame $a$ in a similar manner as the barrels E E are adjustable on said frame $a$.

The operation is as follows: The apparatus is drawn over the ground in the direction of the arrow shown in Fig. 3, and in so doing the pulverizers E $e$ E $e$ are caused to rotate. Their teeth or projections $e$ $e$ enter the soil and cause it to be thoroughly broken up, loosened, and disintegrated, and ready for receiving the seeds. The broken-up soil is leveled by the rake $d$, and the seed fed onto the ground from the receptacle G by means of the slide $g$ and its connecting mechanism to the barrel E, as described, after which the seed is covered by means of the scraper $h$, and finally rolled down and evened by the action of the roller F', as hereinabove set forth.

Having thus fully described the nature, construction, and operation of my invention, I wish to secure by Letters Patent, and claim—

1. The combination, with the frame $a$, of the front and rear rollers, F F', inclosed within said frame, and the pulverizers or harrows E, journaled in separate bearings located in the frame and independently adjustable, substantially as described.

2. The combination, with the frame $a$ and the independently-adjustable harrows E, of the shaft $b$, supported in bearings $b'$ $b'$, and provided with cleaners $b''$ $b''$, made separate and secured to said shaft so as to intermesh with the harrow-teeth, substantially as described.

3. The combination of the frame $a$, the front roller, F, and rear roller, F', both inclosed by said frame, the independently-adjustable harrows E, located between said rollers, the cleaners $b''$ $b''$, located between the harrows, the seed-receptacle G, supported on the frame between the rear harrow and rear roller, the rake $d$ in front of the seed-receptacle, and the continuous scraper $h$ at the rear of said receptacle, substantially as described.

In testimony whereof I have affixed my signature in presence of two witnesses

SUMNER SHAW.

Witnesses:
ALBAN ANDRÉN,
HENRY CHADBOURN.